(12) United States Patent
Terrien et al.

(10) Patent No.: US 11,952,270 B2
(45) Date of Patent: Apr. 9, 2024

(54) METHOD AND SYSTEM FOR PURIFICATION OF HELIUM USING CRYOGENIC, MEMBRANE, AND ADSORPTION TECHNIQUES

(71) Applicants: Air Liquide Advanced Technologies US LLC, Houston, TX (US); L'Air Liquide, Societe Anonyme Pour L'Etude Et L'Exploitation Des Procedes Georges Claude, Paris (FR)

(72) Inventors: Paul Terrien, Syracuse, NY (US); Pierre-Philippe Guerif, Houston, TX (US); Vincent Follaca, Houston, TX (US); Alain Guillard, Houston, TX (US); Youssef Tazi, Verdun (FR)

(73) Assignees: L'Air Liquide, Société Anonyme pour l'Etude et l'Exploitation des Procédés Georges Claude, Paris (FR); Air Liquide Advanced Technologies U.S. LLC, Houston, TX (US)

( * ) Notice: Subject to any disclaimer, the term of this patent is extended or adjusted under 35 U.S.C. 154(b) by 246 days.

(21) Appl. No.: 17/494,763

(22) Filed: Oct. 5, 2021

(65) Prior Publication Data
US 2022/0106190 A1 Apr. 7, 2022

Related U.S. Application Data

(60) Provisional application No. 63/087,691, filed on Oct. 5, 2020.

(51) Int. Cl.
*C01B 23/00* (2006.01)
*B01D 53/22* (2006.01)

(52) U.S. Cl.
CPC ........ *C01B 23/0042* (2013.01); *B01D 53/229* (2013.01); *C01B 23/0078* (2013.01); *B01D 2256/18* (2013.01)

(58) Field of Classification Search
None
See application file for complete search history.

(56) References Cited

U.S. PATENT DOCUMENTS

| 4,675,030 | A |  | 6/1987 | Czarnecki et al. |
| 4,701,187 | A |  | 10/1987 | Choe et al. |
| 4,717,407 | A | * | 1/1988 | Choe .................... B01D 53/229 |
|  |  |  |  | 210/500.21 |
| 5,401,300 | A |  | 3/1995 | Lokhandwala et al. |
| 5,632,803 | A |  | 5/1997 | Stoner et al. |
| 6,179,900 | B1 |  | 1/2001 | Behling et al. |

(Continued)

FOREIGN PATENT DOCUMENTS

| CA | 2 968 601 | 3/2020 |
| WO | WO 2017 020 919 | 9/2017 |

OTHER PUBLICATIONS

Das, et al., "Purification of Helium from Natural Gas by Pressure Swing Adsorption," Current Science, vol. 95, No. 12, Dec. 25, 2008, pp. 1684-1687.

Primary Examiner — Jason M Greene
(74) Attorney, Agent, or Firm — Elwood L. Haynes; Christopher J. Cronin

(57) ABSTRACT

A method and system for purification of helium and $CO_2$ from a stream containing at least Helium, CO2, nitrogen or methane uses a combination of cryogenic, membrane and adsorption technologies.

15 Claims, 12 Drawing Sheets

(56) References Cited

U.S. PATENT DOCUMENTS

| | | | |
|---|---|---|---|
| 7,780,764 B2 | 8/2010 | Baksh | |
| 9,375,677 B2 | 6/2016 | Karode | |
| 10,036,590 B2 | 7/2018 | Ploeger et al. | |
| 10,188,982 B2 | 1/2019 | Keller et al. | |
| 10,207,928 B2 | 2/2019 | Voss et al. | |
| 2016/0115029 A1 | 4/2016 | Van Leuvenhaege et al. | |
| 2016/0184769 A1 | 6/2016 | Kulkarni | |
| 2016/0231051 A1* | 8/2016 | Shah | B01D 53/229 |
| 2017/0045290 A1* | 2/2017 | Ploeger | B01D 53/229 |
| 2018/0353898 A1 | 12/2018 | Hamad et al. | |
| 2019/0176083 A1 | 6/2019 | Bauer et al. | |
| 2020/0088466 A1 | 3/2020 | White et al. | |
| 2022/0314163 A1* | 10/2022 | Salazar Duarte | B01D 53/229 |

* cited by examiner

METHOD AND SYSTEM FOR PURIFICATION OF HELIUM USING CRYOGENIC, MEMBRANE, AND ADSORPTION TECHNIQUES

CROSS-REFERENCE TO RELATED APPLICATIONS

This application claims the benefit of priority under 35 U.S.C. § 119 (e) to U.S. Provisional Patent Application No. 63/087,691, filed Oct. 5, 2020, the entire contents of which are incorporated herein by reference.

BACKGROUND

Field of the Invention

The present invention relates to purification of helium and $CO_2$ from a stream containing at least Helium, $CO_2$, nitrogen or methane.

Related Art

Helium is a very valuable molecule present generally in very small amounts in natural mixtures of gases, such as natural gas extracted from oil and gas fields. In order to use it, it has to be separated and purified from the mixture containing it to a degree of purity varying depending of the application. Purification can be achieved through various industrial processes ranging from cryogenic processes to adsorption and membrane separation. This invention relates to one such method of helium purification combining various technologies, in particular from a stream with a significant $CO_2$ concentration. Such a stream presents the added challenge of greenhouse gas emissions as the stream contains $CO_2$ which might be rejected in the atmosphere during the purification process. Indeed, in order for the process to be environmentally friendly, the $CO_2$ separated needs to be reinjected under pressure for geological sequestration or Enhanced Oil Recovery in order to limit the amounts to be vented to the atmosphere.

A typical helium containing stream contains less than 10 mol % helium, and very often less than 1 mol %. Quite often the rest of gas can contain substantial amounts of carbon dioxide. Carbon dioxide concentration can be very high in particular in certain geological "$CO_2$ wells".

Membrane separation is a very cost effective and simple way to separate gases, but can only achieve a limited amount of enrichment (for instance from 1 mol % to 5 mol %) so multiple stages may be necessary to purify a gas to a concentration high enough for final purification.

U.S. Pat. No. 10,188,982 B2 discloses a combination of PSA technology and membrane for helium purification, however the membrane is used downstream of PSA. The efficiency of such approach may be acceptable but generally it is more advantageous to have a higher concentration to run the PSA. In this patent, the PSA cycle is actually adapted using the help of the membrane permeate in order to function properly.

U.S. Pat. No. 10,036,590 B2 disclose a solution for dealing with a stream containing helium and substantial amounts of $CO_2$. In this patent, the solution proposed consists in cryogenic purification for $CO_2$ removal followed immediately by a pressure swing adsorption (PSA) step. While this solution may work if the amount of nitrogen and methane are low, PSA technology may prove very challenging if the concentration of helium after $CO_2$ removal is not high enough.

U.S. Pat. No. 4,701,187 discloses the concept of a process consisting of a membrane unit feeding into a PSA unit where the low pressure gas from the PSA is recycled back to the membrane unit. However this patent focuses on various separations including only a mixture of $N_2/CH_4/He$ as it relates to helium purification. This fails to address the issue of how to manage a high level of $CO_2$. Specifically if there was a significant amount of $CO_2$, the $CO_2$ would typically concentrate in the recycle loop from PSA to membrane and make the process inefficient.

The prior art does not provide an efficient solution to both manage a low level of helium, high concentration of $CO_2$ and high concentrations of methane and/or nitrogen. For instance, U.S. Pat. No. 10,036,590 details a method where a stream is first purified in a $CO_2$ distillation process but then is further processed in a PSA unit. Helium can be easily separated from $CO_2$ by cryogenic separation but not from other components such as methane or nitrogen. The purified stream exiting the cryogenic section is depleted in $CO_2$ and contains the helium along with nitrogen and methane, as well as other impurities that couldn't be condensed in the cryogenic section. The depleted $CO_2$ stream is sent to a Helium PSA downstream which adsorbs all the components but Helium, therefore producing a He rich stream. Because nitrogen and methane are difficult to adsorb, if substantial amounts of methane and/or nitrogen are present after the separation step, the required adsorption beds will be very large, making the process less efficient and economical. On the other hand, membranes are an ideal alternative to PSA to concentrate helium from a stream containing nitrogen and methane because the surface area required will depend on the amount of helium present rather than on the amount of nitrogen/methane.

SUMMARY

There is disclosed a process for purifying a pressurized feed stream containing at least 30 mol % $CO_2$ and at most 10 mol % helium. The process and system includes the following steps/features. The feed stream is partially condensed, in one or more steps, in order to obtain at least one helium-rich gas stream and at least one $CO_2$-rich liquid stream. The at least one helium-rich gas stream is separated in a gas separation membrane-based separation unit to obtain a first permeate stream and a first residue stream. The first permeate stream, or a fraction thereof, is compressed in order to obtain a compressed permeate stream. At least a fraction of the compressed permeate stream is introduced into a heat exchanger at which the introduced at least one fraction of the compressed stream is partially condensed to produce a gaseous permeate stream and a liquid permeate stream. At least a fraction of the permeate gas stream is further purified in at least one pressure swing adsorption unit to obtain a purified helium stream containing at least 70 mol % helium.

There is also disclosed a process for purifying a pressurized feed stream containing at least 30 mol % CO2 and at most 10 mol % helium. The process comprises the following steps. The pressurized feed stream is partially condensed in a heat exchanger to obtain a helium-rich gas stream and a CO2-rich liquid stream. The helium-rich gas stream is separated in a gas separation membrane-based separation unit to obtain a first permeate stream and a first residue stream. The first permeate stream, or a fraction thereof, is compressed to obtain a compressed permeate stream. At least a fraction of the compressed permeate stream is introduced into the heat exchanger at which the introduced at least one fraction of the compressed stream is partially condensed to produce a gaseous permeate stream and a liquid permeate stream. At least a fraction of the gaseous permeate stream is purified to obtain a purified helium stream containing at least 70 mol % helium.

Either or both of the disclosed processes may include one or more of the following aspects:

- at least a fraction of the liquid permeate stream is mixed with other liquids from said step of partial condensing.
- the at least one $CO_2$-rich liquid stream is expanded in a Joule-Thomson valve to produce a first liquid and a first gas and cooling at least part of the first gas to produce a second liquid and a second gas.
- said step of purifying at least a fraction of the gaseous permeate stream comprises purifying said at least a fraction of the gaseous permeate stream in an adsorption-based separation unit.
- purification of at least a fraction of the gaseous permeate stream in the adsorption-based separation unit also results in at least one waste stream that is combined with the helium-rich gas stream prior to separation of the helium-rich being separated in the gas separation membrane-based separation unit.
- purification of at least a fraction of the gaseous permeate stream in the adsorption-based separation unit also results in at least one waste stream that is combined with the pressurized feed stream prior to partial condensation of the pressurized feed stream in the heat exchanger.
- said adsorption-based separation unit is a pressure swing adsorption (PS) unit or vacuum pressure swing adsorption (VPSA) unit.
- said step of purifying at least a fraction of the gaseous permeate stream comprises purifying said at least a fraction of the gaseous permeate stream in a gas separation membrane-based separation unit.
- at least a fraction of the liquid permeate stream is mixed with at least one of said at least one $CO_2$-rich liquid stream to provide a combined CO2-containing stream.
- at least a portion of the $CO_2$-rich liquid stream is warmed in the heat exchanger.
- the pressurized feed stream is obtained by expanding a raw feed stream in a Joule-Thomson valve, separating the expanded raw feed stream in a phase separator into a first gas stream and a first liquid stream, and removing the first gas stream from the phase separator as the pressurized feed stream.
- an amount of moisture is removed from the pressurized feed stream prior to said step of partial condensation.
- said gas separation membrane-based separation unit comprises first and second membrane stages; and said step of separating the helium-rich gas stream in a gas separation membrane-based separation unit comprises the steps of separating the helium-rich gas stream in the first membrane stage to provide the first permeate stream and the first residue stream, separating the first residue stream in the second membrane stage to provide a second permeate stream and a second residue stream, and optionally combining the second permeate stream with the helium-rich gas stream prior to separation in the first membrane stage.
- said gas separation membrane-based separation unit comprises first and second membrane stages; and said step of separating the helium-rich gas stream in a gas separation membrane-based separation unit comprises the steps of separating the helium-rich gas stream in the first membrane stage to provide the first permeate stream and the first residue stream, separating the first residue stream in the second membrane stage to provide a second permeate stream and a second residue stream, and optionally combining the second permeate stream with the pressurized feed stream prior to partial condensation of the pressurized feed stream in the heat exchanger.
- an amount of hydrogen is removed, by partial oxidation, from the compressed first permeate stream prior to partial condensation of the introduced at least one fraction of the compressed stream.
- an amount of $H_2S$ is removed, with a non-regenerable adsorption bed, from the compressed first permeate stream prior to partial condensation of the introduced at least one fraction of the compressed stream.
- the pressurized feed stream is natural gas or a gas mixture derived from natural gas or associated gas and the pressurized feed stream also includes methane and optionally nitrogen.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DETAILED DESCRIPTION OF THE PREFERRED EMBODIMENTS

Figure 1:
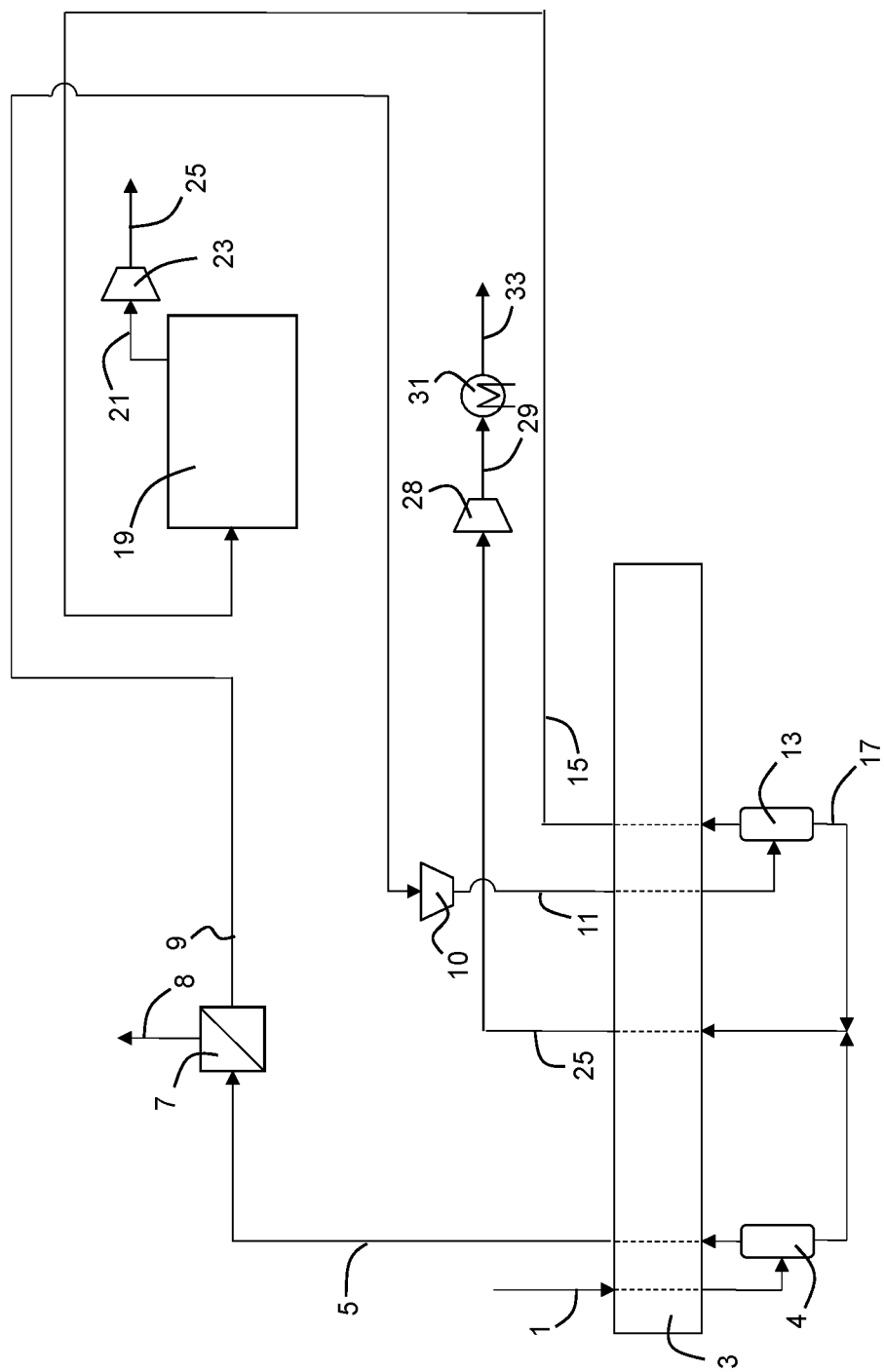
FIG. 1 is a schematic of a generalized embodiment of the invention with optional features.

The invention is a method and system for separating helium from $CO_2$ and at least a third component such as methane or nitrogen from a raw pressurized feed stream containing at least 30 mol % $CO_2$ and at most 10 mol % helium. Typically, the raw pressurized feed stream is at a temperature of 10-80° C. and at a pressure of 30-200 bara. If the pressure is high enough, a Joule-Thomson expansion step may be performed, followed by phase separation into a first gas stream (mostly containing helium) and a first liquid stream (containing most of the $CO_2$ from the raw pressurized feed stream). Typically the phase separation must occur below the critical pressure of $CO_2$ (73.8 bara) and at a temperature below 0° C., preferably below −20° C. The first gas stream is typically at a pressure of −10 to 80° C. (preferably −5° C.) and a pressure of 30-80 bar (preferably −40 bara). The first gas stream may be subsequently cooled down in a heat exchanger. Optionally, an amount of moisture may be removed from the first gas stream by a molecular sieve-based temperature swing adsorption unit utilizing an electrical heater, steam heater, direct fired heater, hot oil heater, or other heat exchanger. Typically, the moisture is removed down to a dew point lower than the lowest temperature in the overall process (typically −40 to −55° C.).

The first main step includes partial condensation of the $CO_2$ contained in the first gas stream through cooling in a main heat exchanger. This partial condensation can be done at various levels of pressures and temperatures. Typically the separation must occur below the critical pressure of $CO_2$ (73.8 bara) and at a temperature below 0° C., preferably below −20° C. Typically, the cooled biphasic stream of the partially condensed first gas stream is at a temperature of −10 to −55° C. (preferably −42° C.) and at a pressure of 10-60 bara (preferably −39 bara). A helium-rich gas stream and a $CO_2$-rich liquid stream are obtained from phase separation of the cooled biphasic stream. The helium-rich gas stream is warmed by the main heat exchanger to a temperature of −10 to 70° C. (at a pressure of 30-80 bara).

In a second main step, the warmed helium-rich gas stream is fed to a gas separation membrane-based separation unit that includes one or more membranes and which may include one or more membrane stages. The membranes include a separation layer made including polyimides, cellulose acetate, and cellulose triacetate. Typically, the separation layer includes a glassy type polymer such as a polyimide. For pressurized feed gas that also includes methane and nitrogen, the membranes will include a separation layer that is selective for helium over nitrogen and methane and which will very efficiently separate methane and nitrogen from the helium. The methane and nitrogen will be recovered on the high pressure residue side while helium will be recovered on the low pressure permeate side. While doing this, the $CO_2$ present in the helium-rich gas fed to the membrane will typically concentrate with the helium. The residue gas may be vented (after optionally being pretreated) or used for another purpose or fed to a second membrane stage. The permeate gas stream is compressed and fed to the main heat exchanger in the third main step.

If the gas separation membrane-based separation unit (to which the helium-rich gas is fed) includes first and second membrane stages, the permeate from the first stage is compressed (and fed to the main heat exchanger) and the residue from the first stage is fed to the second stage. The residue from the second stage is disposed of as described above and the permeate from the second stage is recycled back to the process in one of two ways. First, it may be fed back to the first stage. Second, it may be combined with the pressurized feed gas.

In the third main step, the permeate gas stream from the gas separation membrane-based separation unit, after compression thereof, is fed to the main heat exchanger where it is cooled to a temperature of −10 to −55° C. (preferably −50° C.) and is at a pressure of 6-60 bara (preferably 21 bara) and partially condensed. The biphasic stream obtained is separated into a gaseous permeate stream and a liquid permeate stream. After being warmed in the main heat exchanger, the gaseous permeate stream has a pressure of −30 to 50° C. and a pressure of 5-50 bara.

In the fourth main step, the gaseous permeate stream (obtained from cooling at the main heat exchanger, phase separation, and warming at the main heat exchanger) is fed to a purification step for producing the purified helium stream containing at least 70 mol % helium. This purification step may be carried using adsorption-based separation or membrane-based separation.

In the case of adsorption-based separation, it may include one or two stages of PSA or VPSA units. Suitable adsorbents will remove a desired amount of $CO_2$ and other contaminants present and include but are not limited to molecular sieves, activated carbon, and zeolites. In a particular embodiment, the adsorption-based separation unit includes a $CO_2$ VPSA unit which primarily removes $CO_2$ from the helium-rich gaseous permeate stream received from the heat exchanger. In this particular embodiment, the partially purified stream from the $CO_2$ VPSA unit is fed to a helium PSA unit. Regardless of whether one or two stages are utilized, the adsorption-based separation produces a purified helium stream having at least 70 mol % helium. More typically, it contains 98-98 mol % helium or even 99.9 mol % or more. The purified helium stream is recovered close to the pressure of the gaseous permeate stream (received from the main heat exchanger) that is fed to the adsorption-based separation unit. One or more lower pressure offgases are also produced. This (these) offgas(es) typically contains significant amounts of $CO_2$ and helium and can be advantageously be recycled to the process after re-compression in order to enhance the overall helium recovery of the system and limit the $CO_2$ losses. This may be carried out in one of two ways. First, the one or more offgases may be combined with the helium-rich gas stream (resulting from partial condensation of the pressurized feed gas stream). Second, the one or more offgases may be combined with the pressurized feed gas stream.

In the case of membrane-based separation, the gaseous permeate stream (obtained after warming at the main heat exchanger) is fed to one or more gas separation membranes. Typically, this membrane or these membranes include a separation layer that is the same as that of the gas separation membrane-based separation unit receiving the helium-rich gas stream from the heat exchanger after partial condensation of the pressurized feed gas stream. The gas separation membrane-based separation unit produces a purified helium stream having at least 70 mol % helium. More typically, it contains 98-98 mol % helium or even 99.9 mol % or more.

As shown in FIG. 1, the pressurized feed gas stream 1 is cooled in a main heat exchanger 3 to yield a biphasic stream 1 at a temperature of −10 to −55° C. and at a pressure of 10-60 bara. The biphasic stream is fed to a phase separator 4 to yield a helium-rich gas stream 5 and a stream of $CO_2$-rich liquid. The helium-rich gas stream 5, optionally warmed to 40° C., is fed to a gas membrane-based separation unit 7. A residue stream 8 (deficient in helium compared to helium-rich gas stream 5) is either vented or used for some other purpose. The permeate stream 9, rich in helium compared to helium-rich gas stream 5) is compressed with compressor 10. The compressed permeate stream 11 is then fed to the main heat exchanger 3 to yield a biphasic stream at a pressure of 10-60 bara and at a temperature of −10 to −55° C. The biphasic stream is separated into a gaseous permeate stream 15 and a $CO_2$-rich liquid stream 17 at phase separator 13. Each of the $CO_2$-rich liquid from phase separator 4 and the $CO_2$-rich liquid stream 17 from phase separator 13 are combined and vaporized at main heat exchanger 4 to yield a $CO_2$-rich gaseous stream 26. The $CO_2$-rich gaseous stream 26 is optionally compressed with compressor 28 and the result optionally compressed stream 29 is temperature-moderated at heat exchanger 31 to yield $CO_2$ product stream 33. The gaseous permeate stream 15 is warmed at main heat exchanger 4 (now at a temperature of −30 to 50° C. and at a pressure of 5-50 bara) and fed to purification unit 19. The purified helium stream (having at least 70 mol % helium, more typically 98-98 mol % helium or even 99.9 mol % or higher) is optionally compressed with compressor 23 to yield helium product stream 25.

Figure 2:
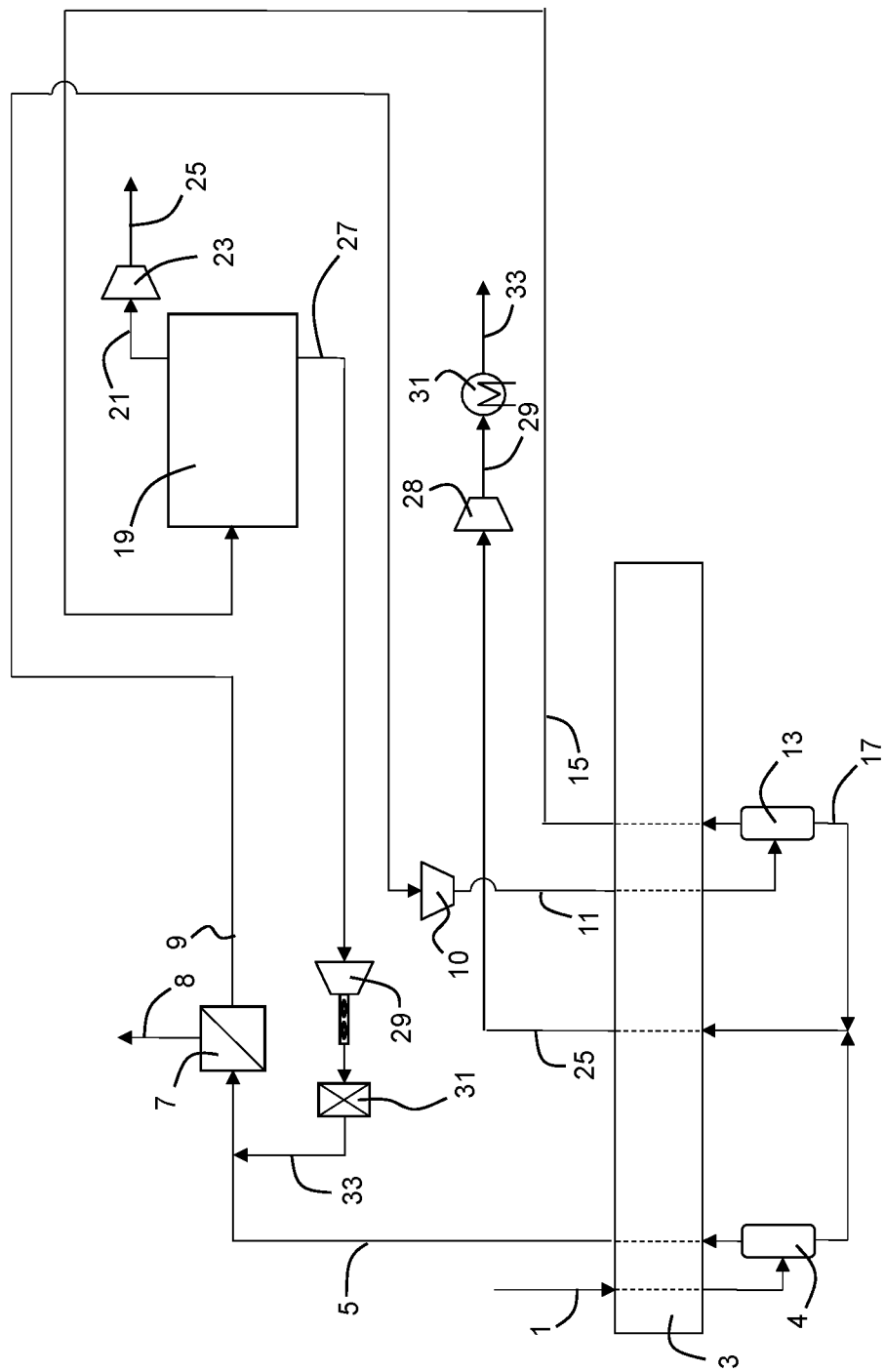
FIG. 2 is an embodiment of the schematic of FIG. 1, including recycle of a waste stream resulting from the purification of the at least a fraction of the gaseous permeate stream back to the initial membrane separation step.

As illustrated in FIG. 2, a waste stream 27 produced by the purification unit 19 may be compressed by compressor 29 and optionally filtered by filter 31 to yield a compressed, filtered stream 33 that is combined with the helium-rich gas stream 5 and fed to the gas separation membrane-based separation unit 7.

Figure 3:
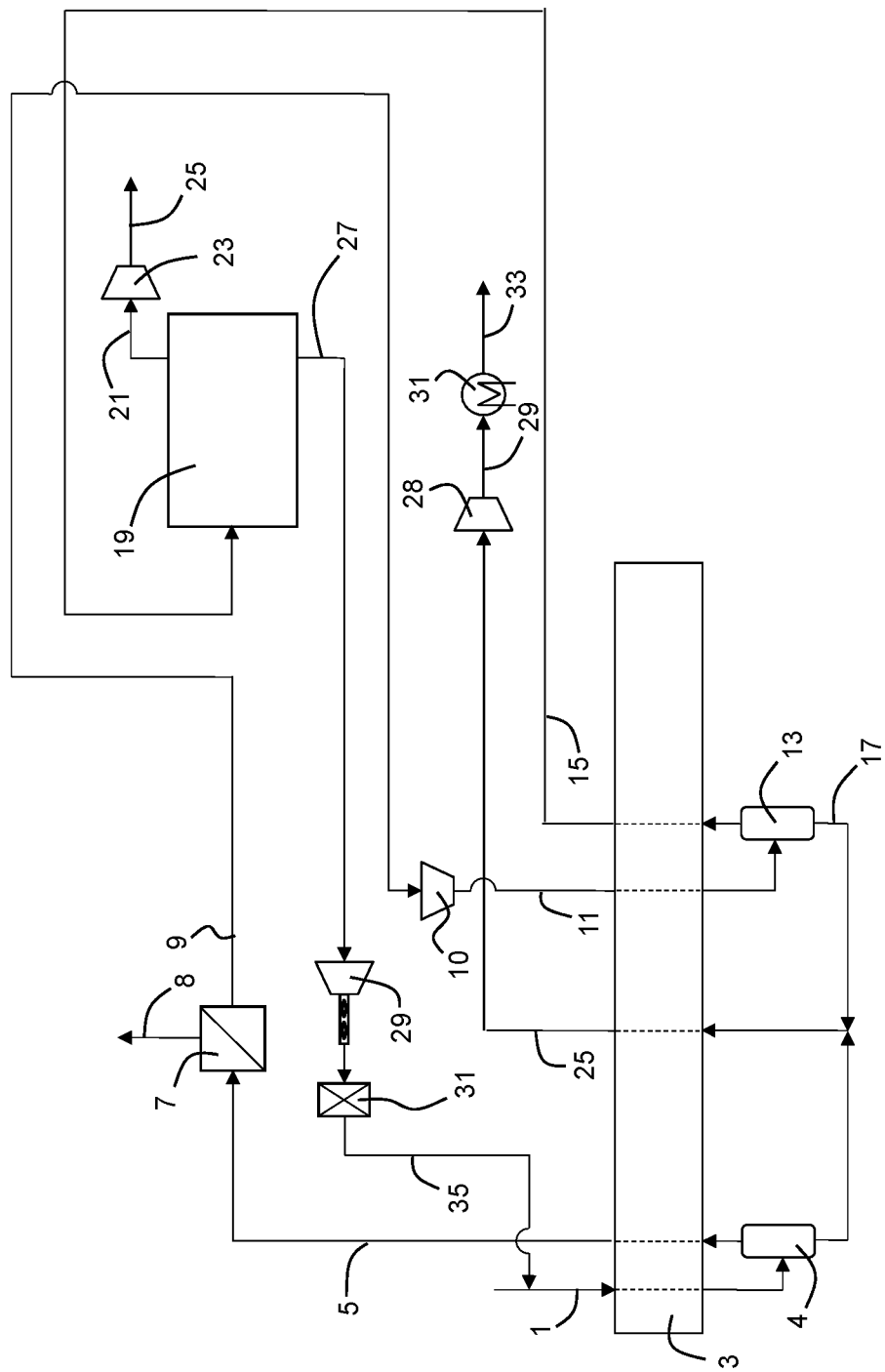
FIG. 3 is an embodiment of the schematic of FIG. 1, including recycle of a waste stream resulting from the purification of the at least a fraction of the gaseous permeate stream to the pressurized feed stream prior to its being partially condensed in the heat exchanger.

As shown in FIG. 3, instead of being combined with the helium-rich gas stream 5, waste stream 27, after being compressed and filtered may be combined as stream 35 with pressurized feed gas stream 1 and cooled at main heat exchanger 4 to partially condense the combined stream.

Figure 4:
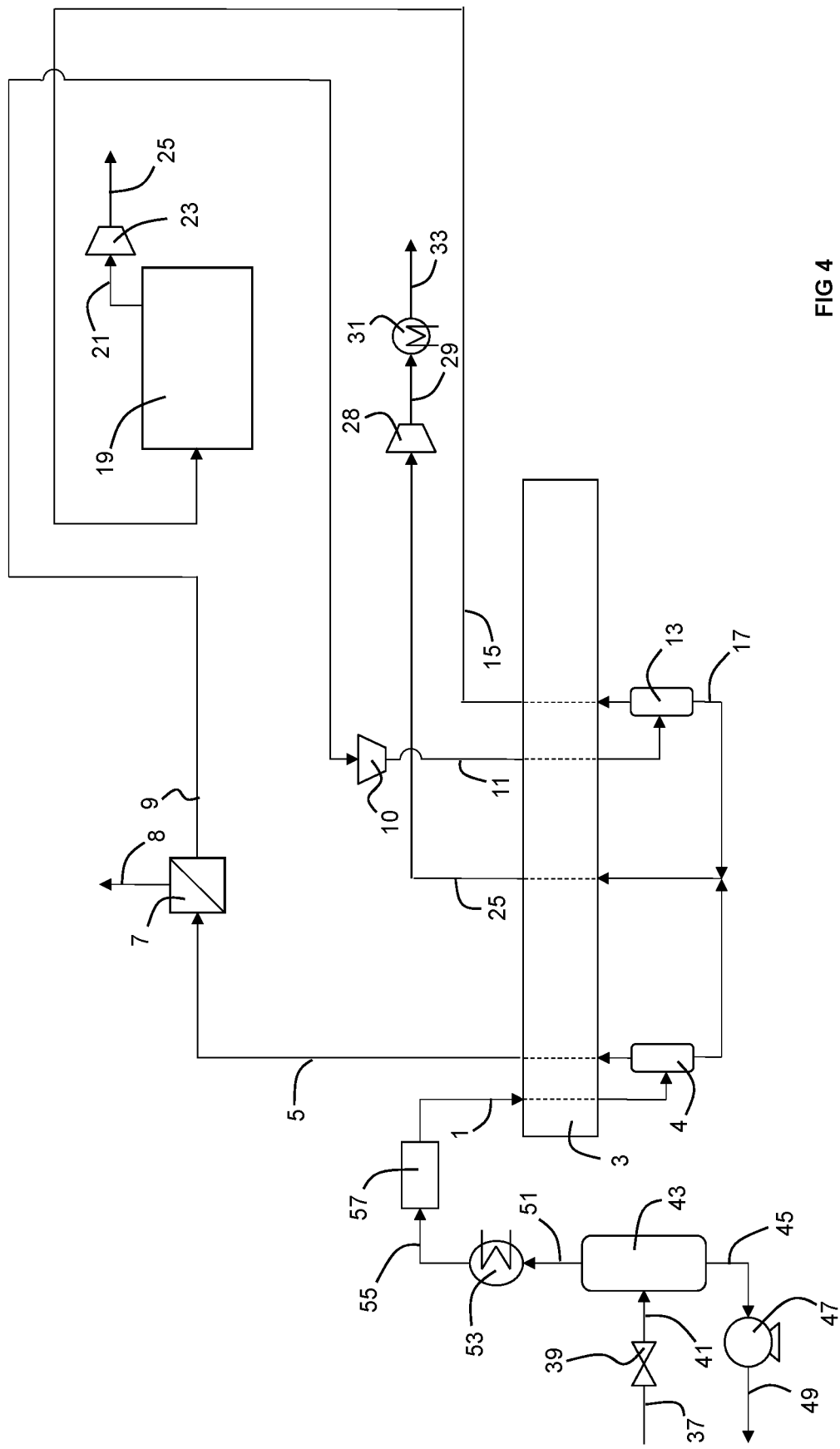
FIG. 4 is an embodiment of the schematic of FIG. 1, including Joule-Thomson expansion of a pressurized raw feed stream, followed by phase separation into a first gas stream and a first liquid stream, and removal of the first gas stream so as to provide the pressurized feed stream.

As illustrated in FIG. 4, a raw pressurized feed stream is expanded from an initial pressure of 30-200 bara and temperature of 10-80° C. to a pressure of 30-80 bara and a temperature of −10 to 80° C. The resultant biphasic stream 41 is fed to a phase separator 43 where a first fraction of $CO_2$ rich liquid 45 is extracted and pumped to high pressure with pump 47 to provide a high pressure $CO_2$ stream 49. A stream 51 of the gaseous phase is heated with heat exchanger 53 and the warmed stream 55 fed to dehydration unit 57 which removes an amount of moisture form stream 55 to yield pressurized feed gas stream 1.

Figure 5:
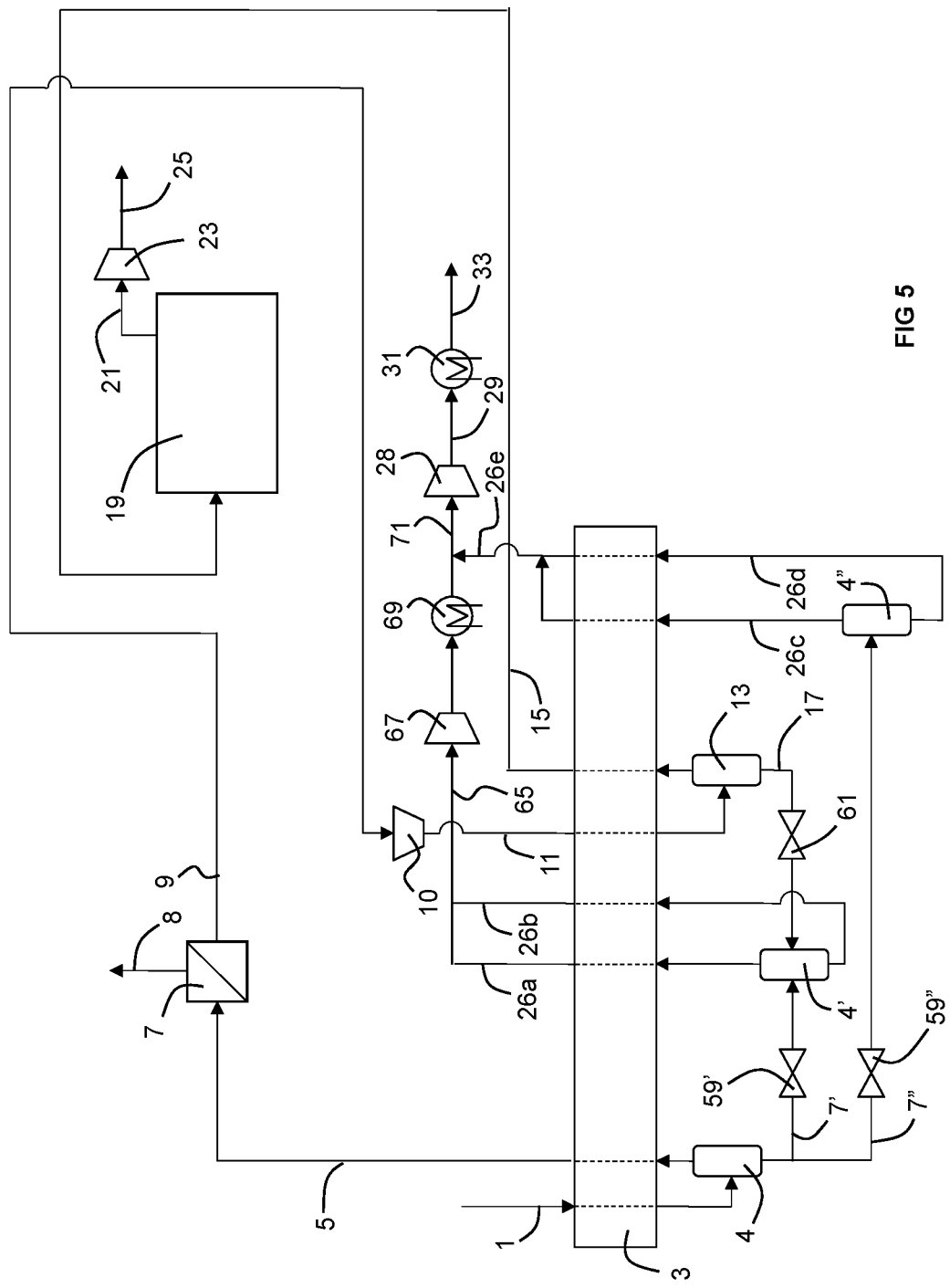
FIG. 5 is an embodiment of the schematic of FIG. 1, including splitting the $CO_2$-rich liquid stream into two streams and warming them in the heat exchanger in an optimized manner.

As shown in FIG. 5, the $CO_2$-rich liquid stream from the phase separator 4 may be divided into two substreams 7', 7". A flow of substream 7' is expanded at valve 59' and fed to phase separator 4'. $CO_2$-rich liquid stream 17 from phase separator 13 is expanded at valve 61 and also fed to phase separator 4'. The resultant gaseous phase 26a and combined liquid stream 26b are warmed at main exchanger 4. A flow of substream 7" is expanded at valve 59" and fed to phase separator 4" where it is separated into a gaseous stream 26c and a liquid stream 27d, each of which provide frigories to main heat exchanger 4 and are warmed. Through serial combinations of increasingly colder flows of gaseous $CO_2$ resulting from vaporization of liquid $CO_2$ streams from phase separators 4' and 4", an optimized compression of result product $CO_2$ 33 may be obtained.

Figure 6:
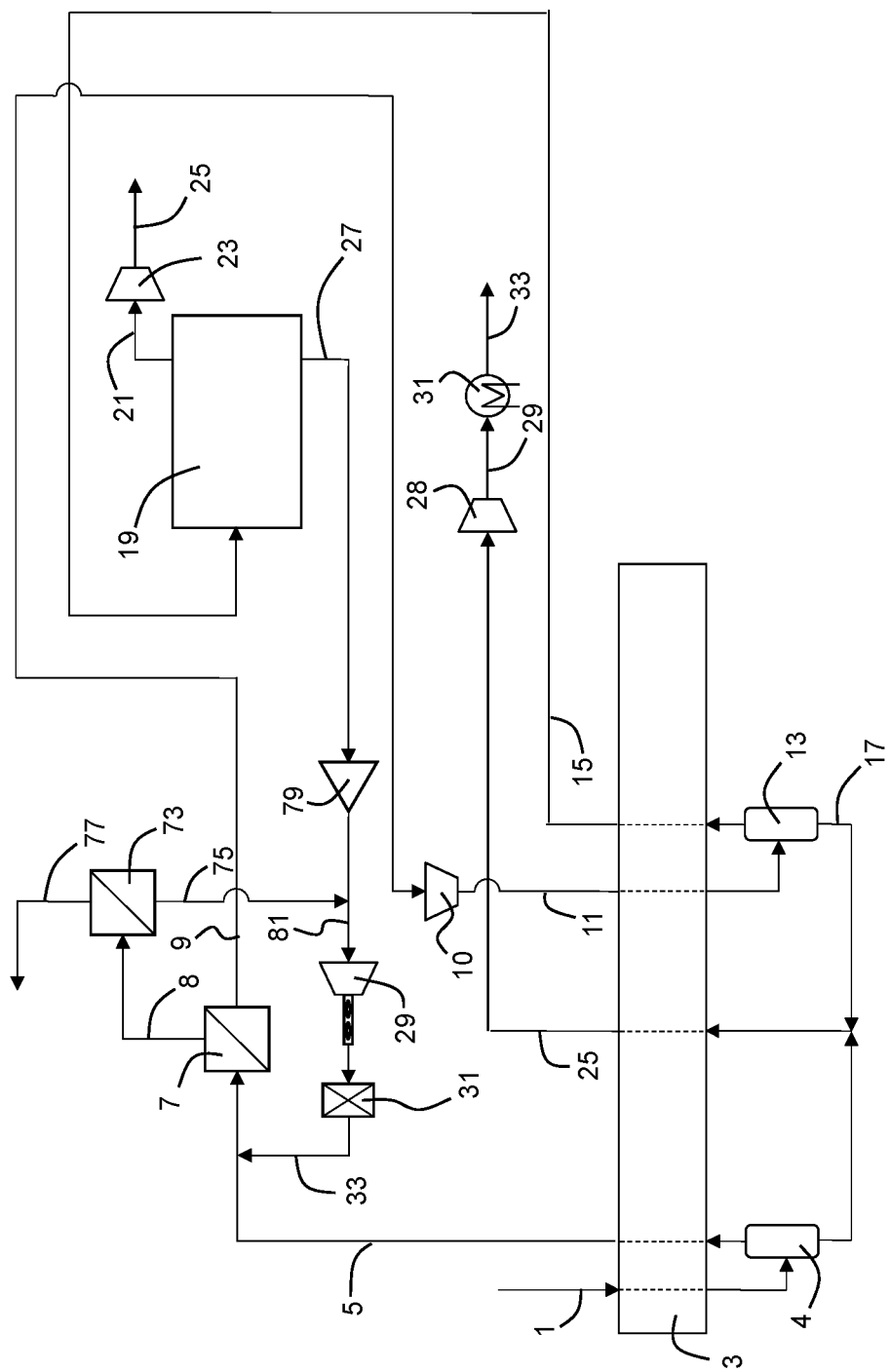
FIG. 6 is an embodiment of the schematic of FIG. 1, in which the gas separation membrane-based separation unit includes first and second membrane stages, the permeate stream from the first stage is compressed and partially condensed in the heat exchanger, the residue stream from the first stage is fed to the second stage, and the permeate stream from the second stage is recycled to the first stage.

As illustrated in FIG. 6, instead of a single stage gas separation membrane-based separation unit, there is a first membrane stage 7 and a second membrane stage 73. The first membrane stage 7 separates the helium-rich gas stream 5 into a first permeate stream 9 and a first residue stream 8. The first permeate stream 9 is enriched in helium compared to helium-rich gas stream 5 and subjected to compression with compressor 10 and fed to main heat exchanger 4. The first residue stream 8 is deficient in helium compared to helium-rich gas stream 5 and is fed to second membrane stage 73. Second membrane stage 73 separates the first residue stream 8 into a second permeate stream 75 and a second residue stream 77. Waste stream 27 from the purification unit 19 is pressure-increased with blower 79 and combined with the second permeate stream 75 to provide combined stream 81. The combined stream 81 is compressed with compressor 29 and optionally filtered with filter 31 before being combined with helium-rich gas stream 5 upstream of the first membrane stage 7. The first residue stream 75 is either vented or used for another purpose.

Figure 7:
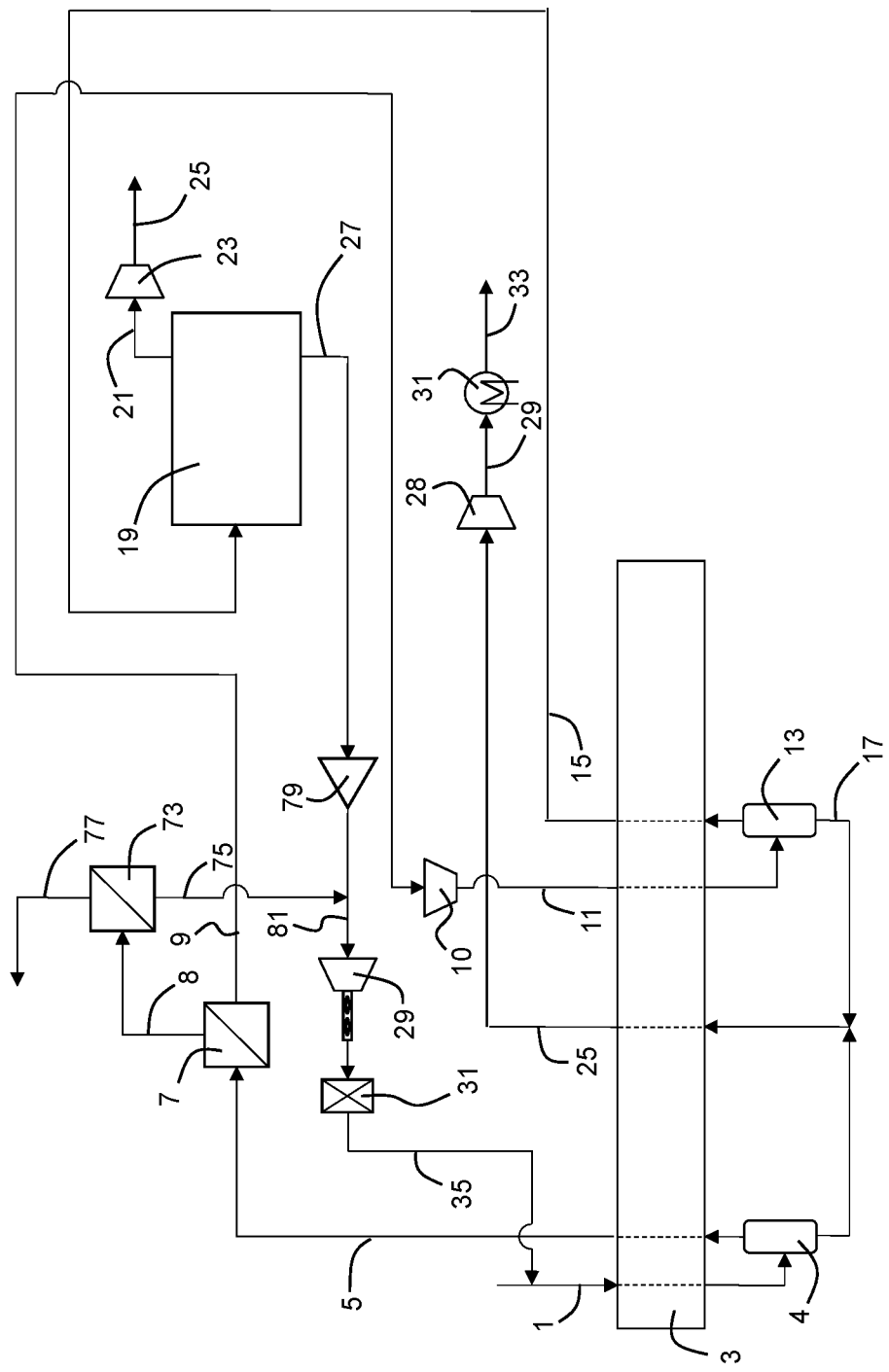
FIG. 7 is an embodiment of the schematic of FIG. 1, in which the gas separation membrane-based separation unit includes first and second membrane stages, the permeate stream from the first stage is compressed and partially condensed in the heat exchanger, the residue stream from the first stage is fed to the second stage, and the permeate stream from the second stage is recycled to the pressurized feed stream.

As shown in FIG. 7, instead of being combined with helium-rich gas stream 5 (after compression by compressor 29 and filtration by filter 31), the combined stream 81 is combined with pressurized feed stream 1.

Figure 8:
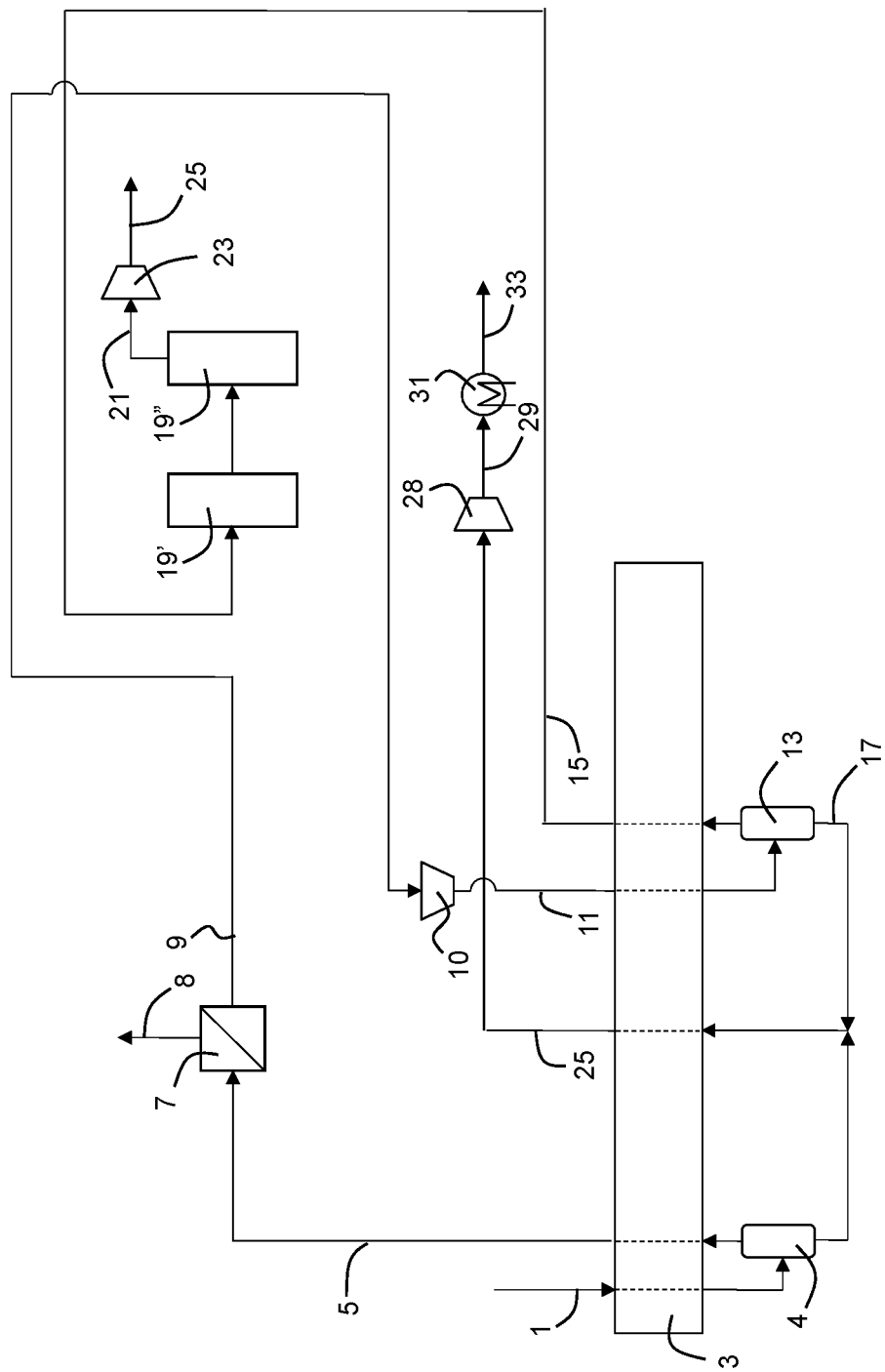
FIG. 8 is an embodiment of the schematic of FIG. 1, in which the purification step to obtain the purified helium stream is performed by first and second stages of PSA or VPSA units.

As illustrated in FIG. 8, the purification 19 is a two-stage adsorption-based purification unit that includes a $CO_2$ VPSA unit 19' and a helium PSA unit 19". The $CO_2$ VPSA unit 19' removes an amount of $CO_2$ from the warmed gaseous permeate stream 15. The thus-purified stream produced by the $CO_2$ VPSA unit 19' is fed to the helium PSA unit 19" which removes remaining contaminants to desired levels.

Figure 9:
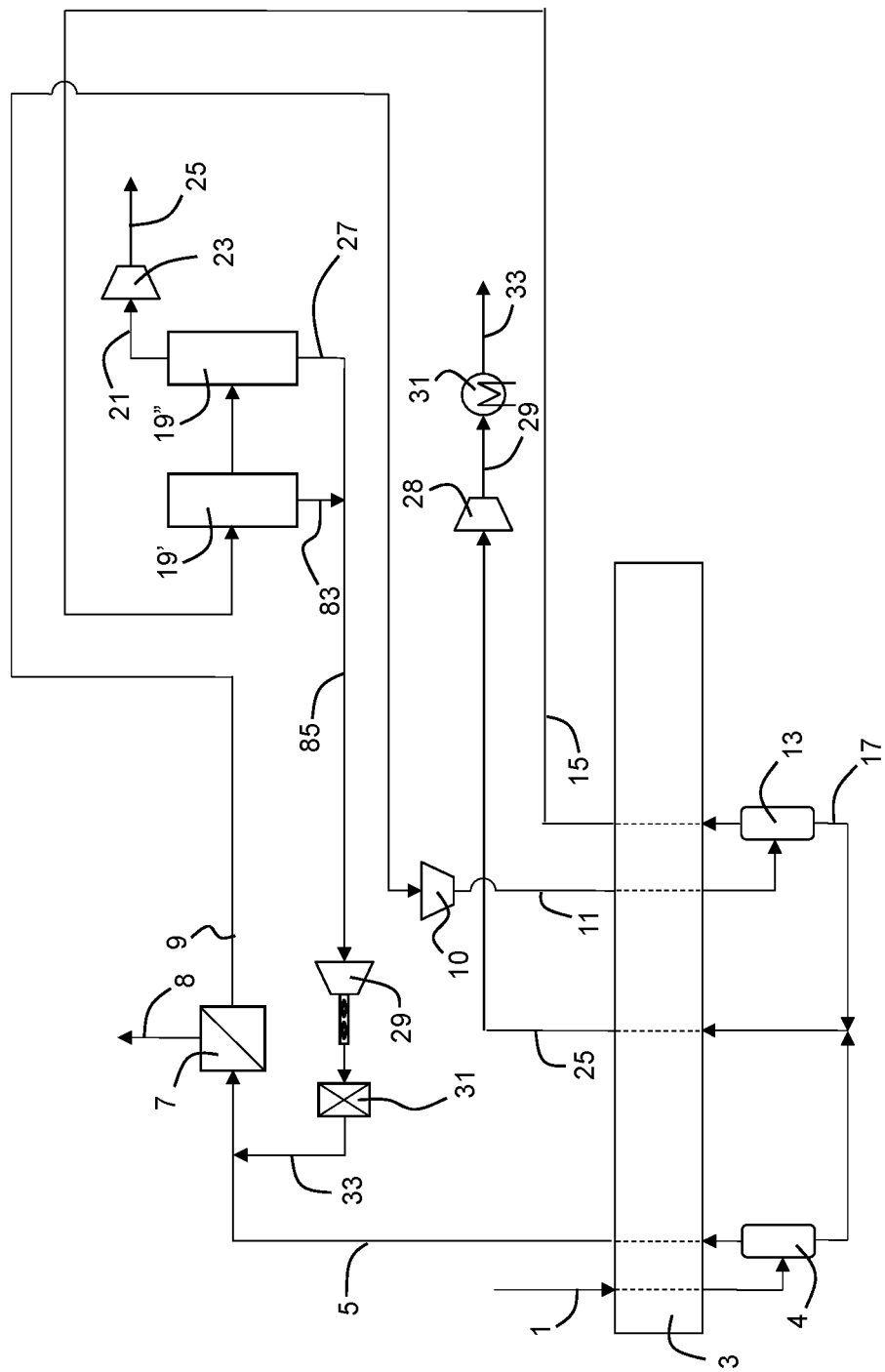
FIG. 9 is an embodiment of the schematic of FIG. 8, including recycle of waste streams from the PSA or VPSA units to the initial membrane separation step.

As shown in FIG. 9, waste stream 83 from $CO_2$ VPSA 19' and waste stream 27 from helium PSA 19" are combined to provide combined waste stream 85, which is subsequently compressed by compressor 29, optionally filtered by filter 31, and combined, as stream 33, with helium-rich gas stream 5 for purification at gas separation membrane-based separation unit 7.

Figure 10:
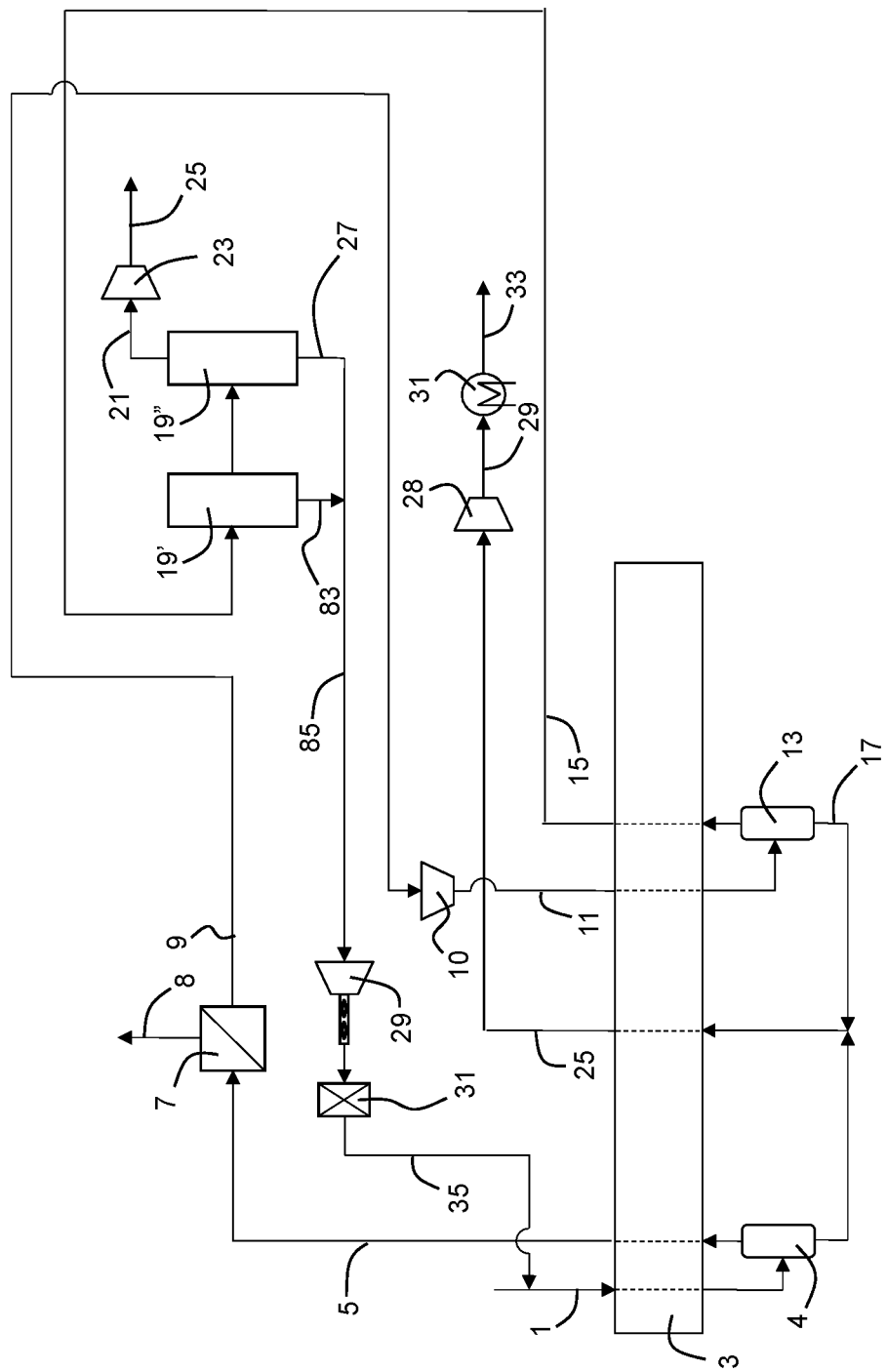
FIG. 10 is an embodiment of the schematic of FIG. 8, including recycle of waste streams from the PSA or VPSA units to pressurized feed stream.

As illustrated in FIG. 10, instead of being combined with helium-rich gas stream 5, the compressed and filtered combined stream 85 is combined, as stream 35, with pressurized feed gas stream 1.

Figure 11:
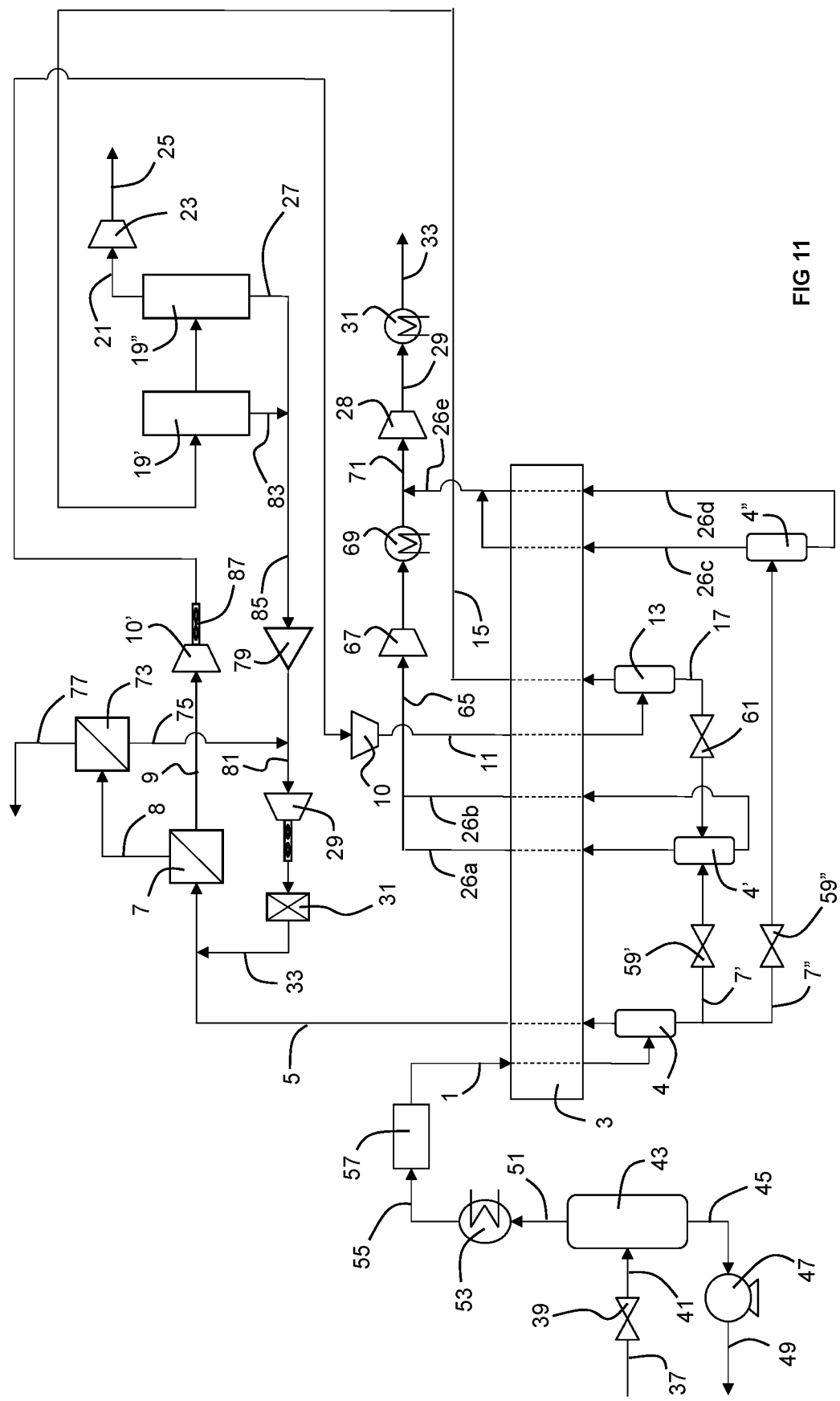
FIG. 11 is an embodiment of the schematic of FIG. 1, including features from the embodiments of FIGS. 4, 5, and 9.

As shown in FIG. 11, this particularly preferred embodiment includes the features shown in FIGS. 4, 5, and 9.

Figure 12:
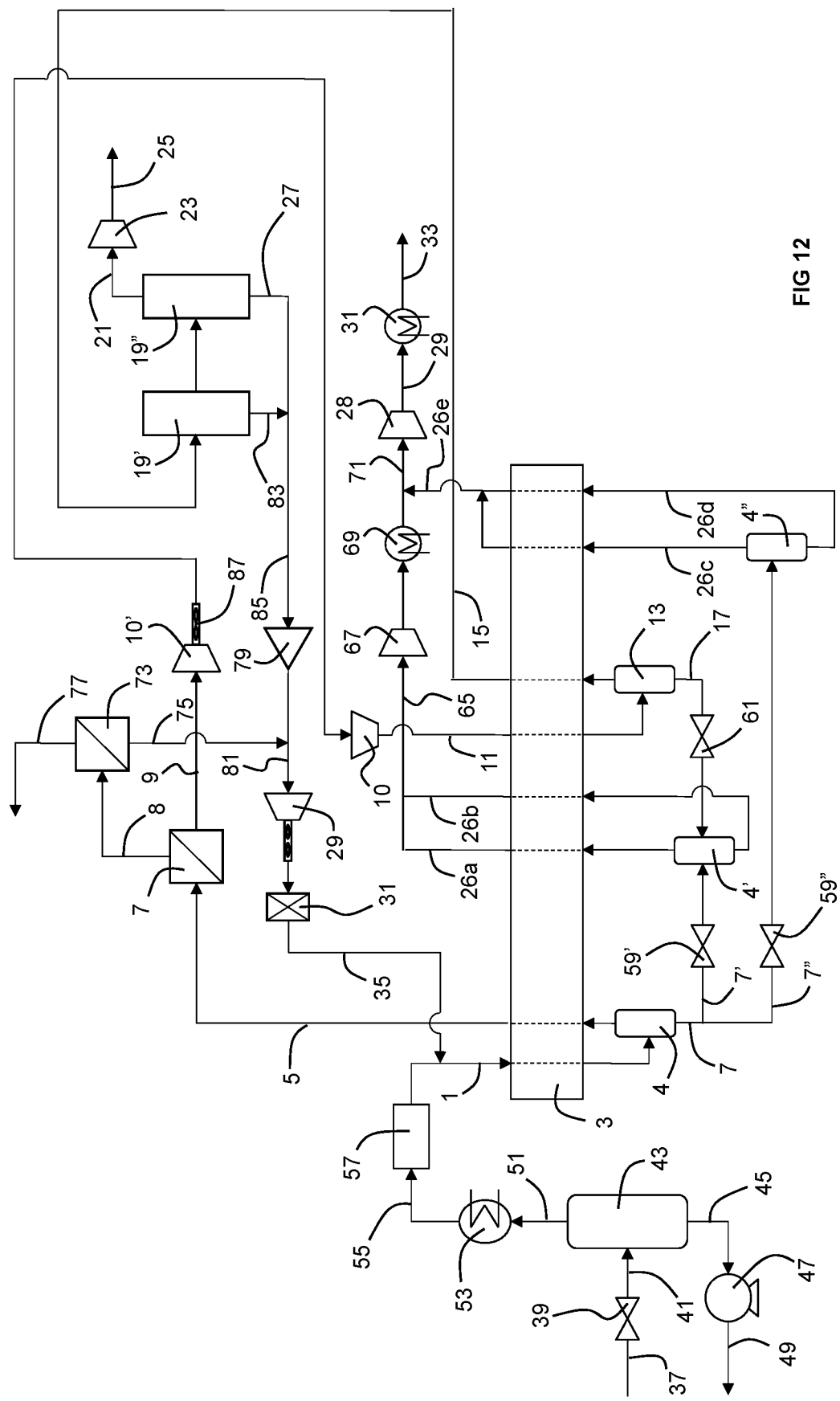
FIG. 12 is an embodiment of the schematic of FIG. 1, including features from the embodiments of FIGS. 4, 5, and 10.

As illustrated in FIG. 12, this particularly preferred embodiment includes the features shown in FIGS. 4, 5, and 10.

Regardless of the specific illustrated embodiment, the permeate stream 9 may be subjected to $H_2$ removal by partial oxidation (typically utilizing a palladium based catalyst bed) and/or $H_2S$ removal with a non-regenerable adsorption-based guard bed (typically utilizing a sulfur impregnated carbon bed).

One of the key innovative elements from this process is the combination and integration of partial condensation process for $CO_2$ removal with membrane and either membrane or PSA (or VPSA) processes for helium purification. The two processes are highly integrated in that a same heat exchanger is used to at least partially condense the pressurized feed stream and also the first permeate.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A process for purifying a pressurized feed stream containing at least 30 mol % $CO_2$ and at most 10 mol % helium, comprising the steps of: partially condensing the pressurized feed stream in a heat exchanger to obtain a helium-rich gas stream and a $CO_2$-rich liquid stream; separating the helium-rich gas stream in a gas separation membrane-based separation unit to obtain a first permeate stream and a first residue stream; compressing the first permeate stream, or a fraction thereof, to obtain a compressed permeate stream; introducing at least a fraction of the compressed permeate stream into the heat exchanger at which the introduced at least one fraction of the compressed stream is partially condensed to produce a gaseous permeate stream and a liquid permeate stream; and purifying at least a fraction of the gaseous permeate stream to obtain a purified helium stream containing at least 70 mol % helium.

2. The process of claim 1, wherein said step of purifying at least a fraction of the gaseous permeate stream comprises purifying said at least a fraction of the gaseous permeate stream in an adsorption-based separation unit.

3. The process of claim 2, wherein purification of at least a fraction of the gaseous permeate stream in the adsorption-based separation unit also results in at least one waste stream that is combined with the helium-rich gas stream prior to separation of the helium-rich being separated in the gas separation membrane-based separation unit.

4. The process of claim 2, wherein purification of at least a fraction of the gaseous permeate stream in the adsorption-based separation unit also results in at least one waste stream that is combined with the pressurized feed stream prior to partial condensation of the pressurized feed stream in the heat exchanger.

5. The process of claim 2, wherein said adsorption-based separation unit is a pressure swing adsorption unit or vacuum pressure swing adsorption unit.

6. The process of claim 1, wherein said step of purifying at least a fraction of the gaseous permeate stream comprises purifying said at least a fraction of the gaseous permeate stream in a gas separation membrane-based separation unit.

7. The process of claim 1, further comprising a step of mixing at least a fraction of the liquid permeate stream with at least one of said $CO_2$-rich liquid stream to provide a combined $CO_2$-containing stream.

8. The process of claim 7, further comprising a step of warming at least a portion of the $CO_2$-rich liquid stream in the heat exchanger.

9. The process of claim 1, wherein the pressurized feed stream is obtained by expanding a raw feed stream in a Joule-Thomson valve, separating the expanded raw feed stream in a phase separator into a first gas stream and a first liquid stream, and removing the first gas stream from the phase separator as the pressurized feed stream.

10. The process of claim 7, further comprising a step of removing moisture from the pressurized feed stream prior to said step of partial condensation.

11. The process of claim 1, wherein: said gas separation membrane-based separation unit comprises first and second membrane stages; and said step of separating the helium-rich gas stream in a gas separation membrane-based separation unit comprises the steps of separating the helium-rich gas stream in the first membrane stage to provide the first permeate stream and the first residue stream, separating the first residue stream in the second membrane stage to provide a second permeate stream and a second residue stream, and optionally combining the second permeate stream with the helium-rich gas stream prior to separation in the first membrane stage.

12. The process of claim 1, wherein: said gas separation membrane-based separation unit comprises first and second membrane stages; and said step of separating the helium-rich gas stream in a gas separation membrane-based separation unit comprises the steps of separating the helium-rich gas stream in the first membrane stage to provide the first permeate stream and the first residue stream, separating the first residue stream in the second membrane stage to provide a second permeate stream and a second residue stream, and optionally combining the second permeate stream with the pressurized feed stream prior to partial condensation of the pressurized feed stream in the heat exchanger.

13. The process of claim 1, further comprising a step of removing an amount of hydrogen, by partial oxidation, from the compressed first permeate stream prior to partial condensation of the introduced at least one fraction of the compressed stream.

14. The process of claim 1, further comprising a step of removing an amount of $H_2S$, with a non-regenerable adsorption bed, from the compressed first permeate stream prior to partial condensation of the introduced at least one fraction of the compressed stream.

15. The process of claim 1, wherein the pressurized feed stream is natural gas or a gas mixture derived from natural gas or associated gas and the pressurized feed stream also includes methane and optionally nitrogen.

\* \* \* \* \*